(12) United States Patent  
Zhang et al.

(10) Patent No.: US 6,553,342 B1
(45) Date of Patent: Apr. 22, 2003

(54) TONE BASED SPEECH RECOGNITION

(75) Inventors: Yaxin Zhang, Hurstville (AU);
Jianming Song, Kingsgrove (AU);
Anton Madievski, Maroubra Beach (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/496,868

(22) Filed: Feb. 2, 2000

(51) Int. Cl.⁷ .............................................. G10L 15/02
(52) U.S. Cl. ........................................ 704/255; 704/207
(58) Field of Search ................................ 704/200, 207, 704/231, 236, 251, 255, 257, 277

(56) References Cited

U.S. PATENT DOCUMENTS

| | | | |
|---|---|---|---|
| 5,602,960 A | 2/1997 | Hon et al. | 704/207 |
| 5,680,510 A | 10/1997 | Hon et al. | 704/255 |
| 5,751,905 A | 5/1998 | Chen et al. | 704/254 |
| 5,884,261 A * | 3/1999 | de Souza et al. | 704/255 |
| 6,035,271 A * | 3/2000 | Chen | 704/207 |
| 6,358,055 B1 * | 3/2002 | Rothenberg | 704/200 |

* cited by examiner

*Primary Examiner*—David D. Knepper
(74) *Attorney, Agent, or Firm*—Kenneth A. Haas

(57) ABSTRACT

A method and apparatus for speech recognition involves classifying (38) a digitized speech segment according to whether the speech segment comprises voiced or unvoiced speech and utilizing that classification to generate tonal feature vectors (41) of the speech segment when the speech is voiced. The tonal feature vectors are then combined (42) with other non-tonal feature vectors (40) to provide speech feature vectors. The speech feature vectors are compared (35) with previously stored models of speech feature vectors (37) for different segments of speech to determine which previously stored model is a most likely match for the segment to be recognized.

17 Claims, 3 Drawing Sheets

TONE BASED SPEECH RECOGNITION

FIELD OF THE INVENTION

This invention relates to a method and apparatus for speech recognition, particularly, though not exclusively, to a method and apparatus for recognising speech in a tonal language, such as Mandarin Chinese.

BACKGROUND OF THE INVENTION

Speech recognition techniques are well known for recognising words spoken in English or other non-tonal languages. These known speech recognition techniques basically perform transformations on segments (frames) of speech, each segment having a plurality of speech samples, into sets of parameters sometimes called "feature vectors". Each set of parameters is then passed through a set of models, which has been previously trained, to determine the probability that the set of parameters represents a particular known word or part-word, known as a phoneme, the most likely word or phoneme being output as the recognised speech.

However, when these known techniques are applied to tonal languages, they generally fail to deal adequately with the tone-confusable words that can occur. Many Asian languages fall in this category of tonal languages. Unlike English, a tonal language is one in which tones have lexical meanings and have to be considered during recognition. A typical example is Mandarin Chinese. There are more than 10,000 commonly used Chinese characters, each of which is mono-syllabic. All these 10,000 characters are pronounced as just 1345 different syllables, the different meanings of a particular syllable being determined by the listener from the context of the speech. In fact, from the 1345 different syllables, a non-tonal language speaker would probably distinguish just over 400 different sounds, since many of the syllables sound similar and can only be distinguished by using different tones. In other words, if the differences among the syllables due to tone are disregarded, then only 408 base syllables instead of 1345 tonal syllables would be recognised in Mandarin Chinese. However, this would cause substantial confusion since all the tonal syllables having the same base syllable would be recognised as the same syllable. A well-known example is that, in Mandarin, both "MOTHER" and "HORSE" are sounded as "ma" but distinguished by differences in tone.

As shown in FIGS. 1A, 1B, 1C, 1D and 1E, in Mandarin Chinese there are four lexical tones: a high and level Tone 1, a rising Tone 2, a falling-rising Tone 3, and a falling Tone 4; and one neutral Tone 5, which is used on some syllables that are a suffix to a word. However, in other tonal languages there may be different numbers of tones, for example seven, as in Cantonese Chinese. It is known that the tones are primarily characterized by their pitch contour patterns. The pitch is equivalent to the fundamental frequency of the audio signal and the pitch contour is equivalent to the frequency contour. Thus, one known tonal language speech recognition system, such as that described in U.S. Pat. No. 5,602,960 (Hsiao-Wuen Hon, et al), uses a syllable classifier, a tone classifier and a confidence score augmentor. The tone classifier has a pitch estimator to estimate the pitch of the input once and a long-term tone analyser to segment the estimated pitch according to the syllables of each of the N-best theories. The long-term tone analyser performs long term tonal analysis on the segmented, estimated pitch and generates a long-term tonal confidence signal. The confidence score augmentor receives the initial confidence scores and the long-term tonal confidence signals, modifies each initial confidence score according to the corresponding long-term tonal confidence signal, re-ranks the N-best theories according to the augmented confidence scores, and outputs the N-best theories. This system is, however, computational resource intensive and is also language dependent, in that the syllables are recognised first and then classified into the particular tones for which the system has been calibrated or trained. Thus, if the language is to be changed from, for example Mandarin Chinese to Cantonese Chinese, not only does the syllable recogniser need retraining, but the tone classifier also needs to be recalibrated for seven tones instead of only five.

Another known way of recognising syllables in a tonal language is described in U.S. Pat. No. 5,806,031 (Fineberg) in which a tonal sound recogniser computes feature vectors for a number of segments of a sampled tonal sound signal in a feature vector computing device, compares the feature vectors of a first of the segments with the feature vectors of another segment in a cross-corrrelator to determine a trend of a movement of a tone of the sampled tonal sound signal, and uses the trend as an input to a word recogniser to determine a word or syllable of the sampled tonal sound signal. In this system, the feature vector is computed for all syllables, irrespective of whether they are voiced or unvoiced.

A voiced sound is one generated by the vocal cords opening and closing at a constant rate giving off pulses of air. The distance between the peaks of the pulses is known as the pitch period. An example of a voiced sound is the "i" sound as found in the word "pill". An unvoiced sound is one generated by a single rush of air which results in turbulent air flow. Unvoiced sounds have no defined pitch. An example of an unvoiced sound is the "p" sound in the word "pill". A combination of voiced and unvoiced sounds can thus be found in the word "pill", as the "p" requires the single rush of air and the "ill" requires a series of air pulses.

Although essentially all languages use voiced and unvoiced sounds, in tonal languages the tone occurs only in the voiced segments of the words.

BRIEF SUMMARY OF THE INVENTION

The present invention therefore seeks to provide a method and apparatus for speech recognition, which overcomes, or at least reduces the above-mentioned problems of the prior art.

Accordingly, in a first aspect, the invention provides a system for speech recognition comprising an input terminal for receiving a segment of speech, a speech classifier having an input coupled to the input terminal and an output to provide an indication of whether the speech segment comprises voiced or unvoiced speech, a speech feature detector having a first input coupled to the input terminal, a second input coupled to the output of the of the speech classifier, and an output to provide a speech feature vector having a plurality of feature values indicating features of the speech segment, the speech feature vector including at least a tonal feature value indicating a tonal feature of the speech segment when the speech segment comprises voiced speech, and a speech recogniser having an input coupled to the output of the speech feature detector and an output to provide an indication of which of a predetermined plurality of speech models is a good match to the speech segment.

In a preferred embodiment, the system further comprises an Analog-to-Digital (A/D) converter having an input coupled to the input terminal and an output coupled to the inputs of the speech classifier and the speech feature detector to provide a digitised speech segment.

The output of the speech recogniser preferably provides an indication of which one of the predetermined plurality of speech models is a best match to the speech segment.

Preferably, the system further comprises a memory coupled to the speech recogniser for storing the predetermined plurality of speech models, and a speech model trainer having an input selectively coupled to the output of the speech feature detector and an output coupled to the memory to store in the memory the predetermined plurality of speech models after the predetermined plurality of speech models have been trained using the speech feature vector.

The speech feature detector preferably comprises a non-tonal feature detector having an input coupled to the input of the speech feature detector and an output to provide at least one non-tonal feature value for the speech segment, a tonal feature detector having a first input coupled to the input of the speech feature detector, a second input coupled to the output of the speech classifier and an output to provide at least one tonal feature value for the speech segment when the speech classifier determines that the speech segment comprises voiced speech, and a speech feature vector generator having a first input coupled to the output of the non-tonal feature detector, a second input coupled to the output of the tonal feature detector, and an output coupled to the output of the speech feature detector to provide the speech feature vector.

The non-tonal feature detector preferably comprises a non-tonal speech transformation circuit having an input coupled to the input of the non-tonal feature detector and an output to provide a transformed non-tonal signal, and a non-tonal feature generator having an input coupled to the output of the non-tonal speech transformation circuit and an output coupled to the output of the non-tonal feature detector to provide the at least one non-tonal feature value for the speech segment.

The tonal feature detector preferably comprises a tonal speech transformation circuit having first and second inputs coupled to the first and second inputs of the tonal feature detector and an output to provide a transformed tonal signal, and a tonal feature generator having an input coupled to the output of the tonal speech transformation circuit and an output coupled to the output of the tonal feature detector to provide the at least one tonal feature value for the speech segment.

In one preferred embodiment, the tonal speech transformation circuit comprises a pitch extractor having an input coupled to the first input of the tonal speech transformation circuit and an output, and a tone generator having a first input coupled to the output of the pitch extractor and an output coupled to the output of the tonal speech transformation circuit to provide the transformed tonal signal indicative of the tone of the speech segment.

The tone generator preferably has a second input coupled to the second input of the tonal speech transformation circuit.

In a second aspect, the invention provides a method of speech recognition comprising the steps of receiving a segment of speech, classifying the speech segment according to whether the speech segment comprises voiced or unvoiced speech, detecting a plurality of speech features of the segment of speech, generating a speech feature vector having a plurality of feature values indicating the detected plurality of features of the speech segment, wherein the speech feature vector includes at least a tonal feature value indicating a tonal feature of the speech segment when the speech segment comprises voiced speech, and utilising the speech vector to determine which of a predetermined plurality of speech models is a good match to the speech segment.

The method preferably further comprises the step of digitising the segment of speech to provide a digitised speech segment.

Preferably, the step of utilising the speech vector determines which of the predetermined plurality of speech models is a best match to the speech segment.

In a preferred embodiment, the method further comprises the steps of training the predetermined plurality of speech models using the speech feature vector, and storing the predetermined plurality of speech models after the predetermined plurality of speech models have been trained.

Preferably, the step of detecting a plurality of speech features comprises the steps of generating at least one non-tonal feature value for the speech segment, generating at least one tonal feature value for the speech segment when the speech classifier determines that the speech segment comprises voiced speech, and combining the at least one non-tonal feature value and the at least one tonal feature value to provide the speech feature vector.

Preferably, the step of detecting at least one non-tonal feature value comprises the steps of, transforming the speech segment using at least a first transformation to provide a transformed non-tonal signal, and generating the at least one non-tonal feature value from the transformed non-tonal signal.

Preferably, the step of detecting at least one tonal feature value comprises the steps of transforming the speech segment using at least a second transformation to provide a transformed tonal signal, and generating the at least one tonal feature value from the transformed tonal signal.

In one preferred embodiment, the step of transforming the speech segment comprises the steps of extracting pitch information from the speech segment, and generating the transformed tonal signal from the extracted pitch information.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
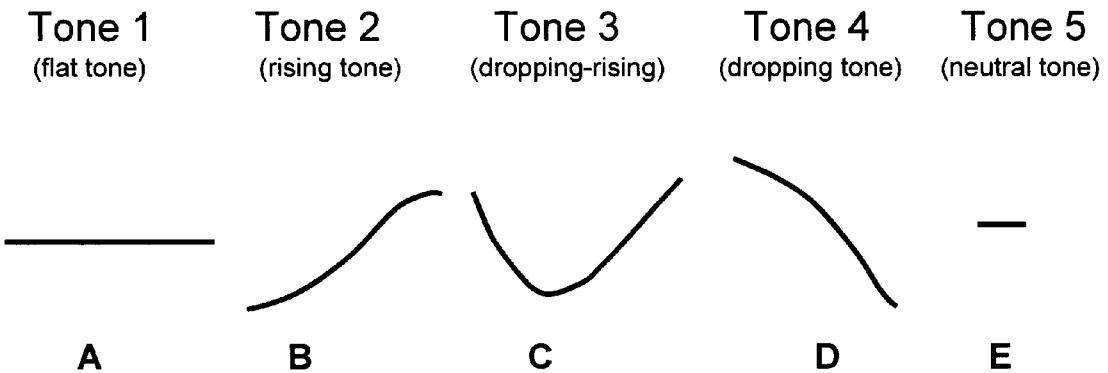
FIG. 1 shows the five tone patterns in the Mandarin Chinese language.

Thus, as mentioned above, FIG. 1 shows the five tone patterns in the Chinese Mandarin language. A tone pattern is a trajectory of pitch frequency in the time domain. A flat Tone 1, for example, means that the pitch frequency of the speech signal does not change during a certain time period, a rising Tone 2 implies that the pitch frequency changes monotonously from low to high, a falling-rising Tone 3 implies that the pitch frequency changes from high to low and then back again from low to high. A falling Tone 4 implies that the pitch frequency changes monotonously from high to low, whereas the neutral Tone 5 has a constant pitch frequency, similar to that of the flat tone.

Figure 2:
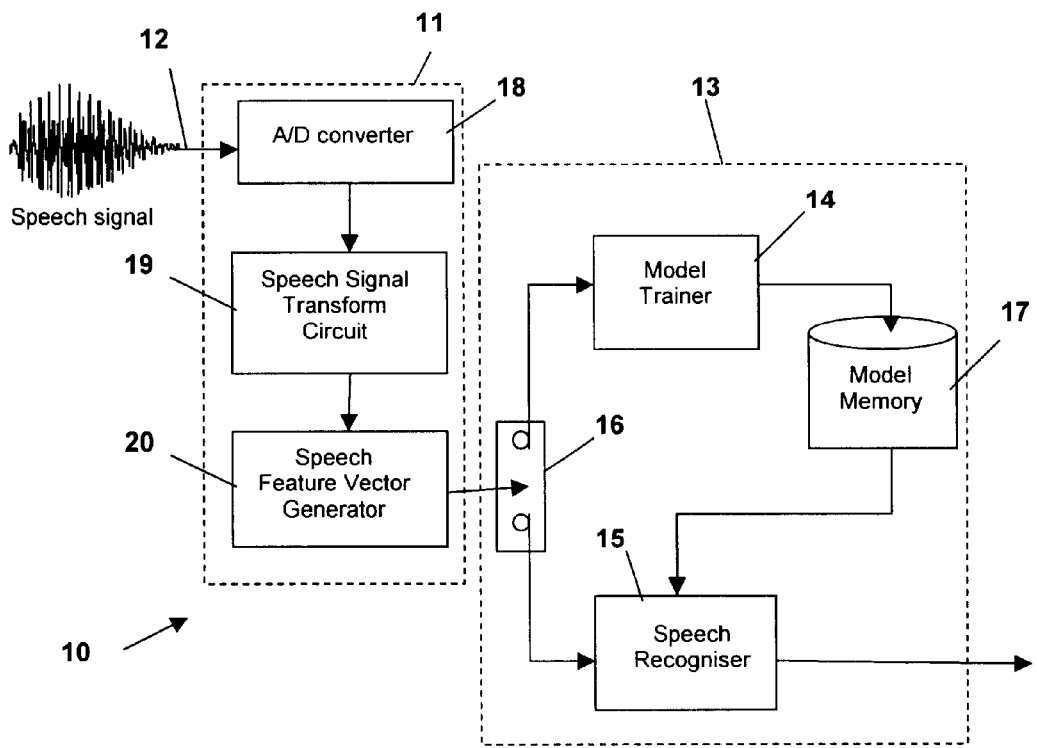
FIG. 2 shows a known Hidden Markov Modeling (HMM) based automatic speech recognition system.

Referring now to FIG. 2, a known Hidden Markov Modeling (HMM) based automatic speech recognition system 10 can be considered basically as a pattern matcher. As can be seen, it is basically divided into two parts. The first is the speech processing module 11, which takes the speech signal at an input 12 and processes it to provide spectral parameters, which are commonly called speech feature vectors to be used for model training and matching, as will be more fully described below. The second part is the speech recognition module 13, which receives the speech feature vectors and switches them either to a model training unit 14 or a speech recognition unit 15 by means of a switch unit 16.

The system 10 uses a large quantity of speech signals to train a number of patterns, which are called models in terms of speech recognition. Each model represents an acoustic unit, which may be a word, a syllable, or a phoneme. In other words, the speech signals must be segmented into acoustic units and a representative for each of them must be found. During training, all segments belonging to a particular speech unit will be used to find the statistical characteristics for the unit. The combination of these statistical characteristics is called the model for the speech unit. All the models determined during the training phase are stored in a database 17. During recognition, the input speech signals are segmented into units and sent to the recognizer to find their best-matched model stored in the database 17 and the best-matched model will be the output of the speech recognition module 13.

For both model training and recognition, the speech signal must first be digitized. Thus, the speech signal at the input 12 of the speech processing module 11 is passed to a digitizer 18, where the speech signal is first converted from an Analog signal to a Digital signal and then divided into segments, which are normally 10–20 milliseconds in length. The segments, commonly called frames (which are basic analysis and processing units), are then passed to a speech signal transformation circuit 19, where they undergo a series of mathematical transformations. During the transformations the signal frames are processed so that a set of spectral parameters, which are commonly called speech feature vectors, can be generated in a speech feature vector generator 20. These speech feature vectors are used as the input to the speech recognition module 13 for the model training and speech recognition calculations.

In such a conventional speech recognition system, the feature parameters are chosen to try to represent the lexical meaning carried by the acoustic signals while trying to ignore the emotional meaning and any the speaker's personality because such latter information causes great problems in trying to understand the lexical meaning. Tones in the English language are an example of such redundant information to a conventional speech recognition system and are therefore often disregarded during the signal processing and transformation stages. However, as discussed above, tones in tonal languages represent certain lexical meanings. In Chinese mandarin, for example, the five tones accompanying a syllable always mean five different characters and have different lexical meanings. Because the feature vectors derived by the conventional speech recognizers do not include any tonal information, they cannot distinguish tones in the speech signals, so that they often fail to recognize the lexical meanings in tonal speech.

Figure 3:
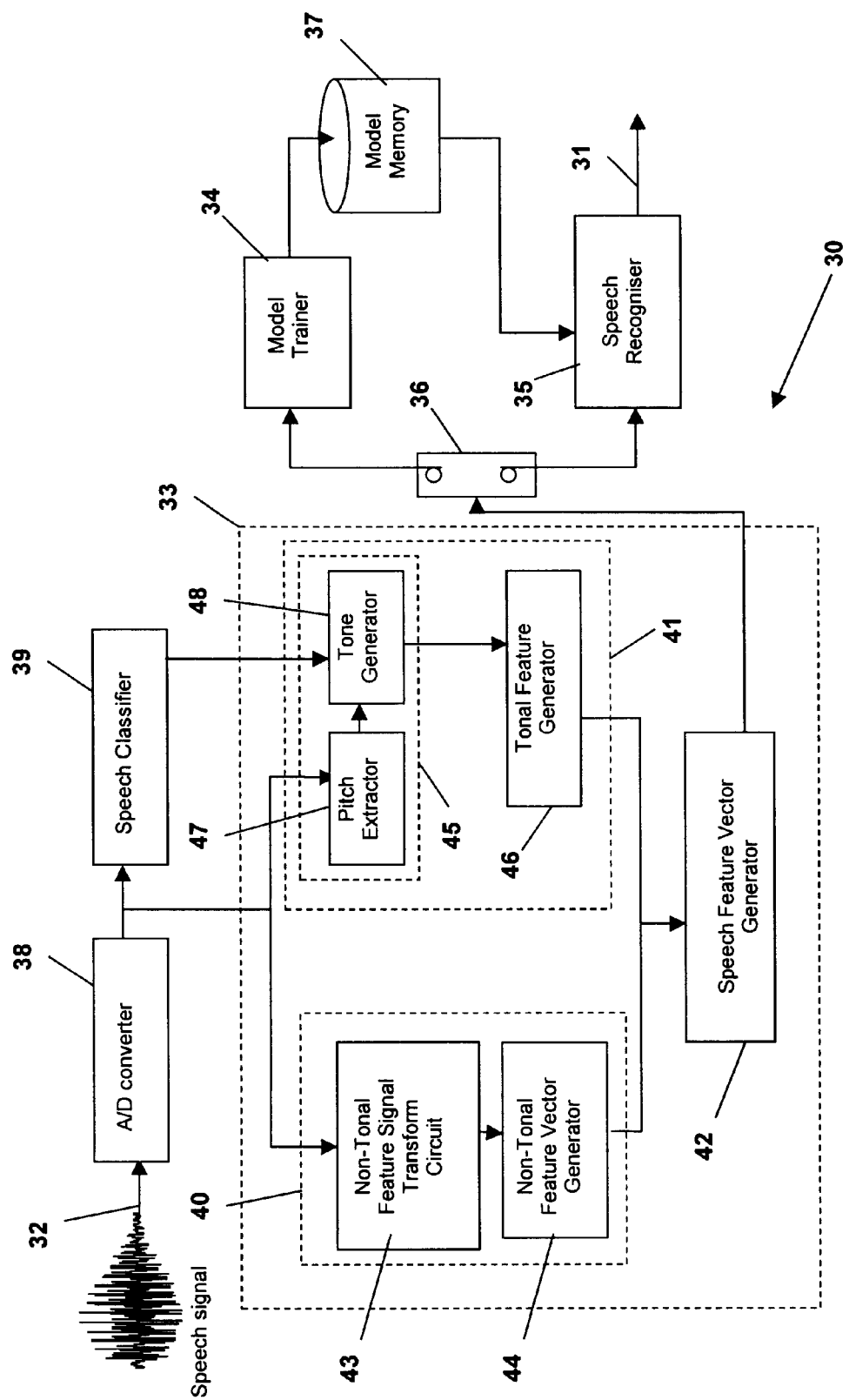
FIG. 3 shows a block diagram of a speech recognition system according to one embodiment of the present invention.

Turning now to FIG. 3, there is shown schematically, an embodiment of a speech recognition system according to the present invention. In this embodiment, a speech recognition system 30 again has a speech processing module and a speech recognition module, which are not indicated separately in the drawing. The speech recognition module receives the speech feature vectors and switches them either to a model trainer 34 or a speech recogniser 35 by means of a switch 36. All the models determined during the training phase are stored in a model memory 37, from where they are taken by the speech recogniser during the speech recognition phase to be compared with the representative of the input speech and the best-matched model is presented at the output 31 of the speech recognition module. This speech recognition module operates substantially the same as the speech recognition module 13 in FIG. 1 and therefore its operation will not be described further here.

The speech processing module comprises an input 32 for receiving an input speech signal and a speech digitizer 38, where the speech signal is first converted from an Analog signal to a Digital signal and then divided into frames. The digitised frames are passed to both a speech classifier 39 and to a speech feature detector 33. The speech classifier is used to distinguish between different types of speech. The speech feature detector 33 includes a non-tonal feature detector 40 and a tonal feature detector 41. The non-tonal feature detector 40 comprises a non-tonal feature transformation circuit 43 and a non-tonal feature vector generator 44, which are similar to the signal transformation circuit 19 and the speech feature vector generator 20 described above with reference to FIG. 1. The tonal feature detector 41 comprises a tonal feature speech transformation circuit 45 and a tonal feature vector generator 46. The outputs of the non-tonal feature vector generator 44 and the tonal feature vector generator 46 are then combined in a speech feature vector generator 42 to provide the speech feature vectors, which are passed to switch 36 to be switched to either the model trainer 34 or the speech recogniser 35. With combined feature vectors including the conventional features and tone features, the trained models are able to represent tone information, and the recognizer can better distinguish the tone differences in the speech signals.

The tonal feature speech transformation circuit 45 comprises a pitch extractor 47 and a tone signal generator. Tone is basically a change in pitch frequency. Therefore in order to detect tone, the pitch extractor is used to estimate a pitch frequency for each frame of speech signal. The changes in pitch frequency are then utilised to determine the tone. Pitch detectors are known in the art and any desired implementation of a pitch detector can be used. One example of such a pitch detector is that described in an article entitled "Digital Processing of Speech Signal" by L. R. Rabiner & R. W. Schafer published by Prentice-Hall 1978, Page 156. The algorithm uses autocorrelation of consecutive speech frames in the time domain to find the pick value of the autocorrelation function. The distance between two such pick values is the period of pitch.

Speech signal can be broadly divided into three categories, voiced speech, unvoiced speech, and silence. Voiced speech includes vowels and diphthongs. Unvoiced speech consists of consonants and semivowels. While silence represents the pauses between words and sentences, as well as before and after sentences. It should be noted that tone only occurs in voiced speech. The other two types of speech signal do not have consistent pitch frequency changes. Thus, a signal type classifier is utilised to determine which category of speech a speech frame belongs to. Pitch frequency is then only utilised to determine tone for a frame of speech signal when this frame consists of voiced speech. For all frames belonging to the other two types of signal, no tone signal is output from the tonal feature speech transformation circuit 45.

Since tone information in speech is represented by movement of pitch in the frequency domain, a change in pitch can be used as a tonal feature. Thus, tone generation constitutes changing pitch into a tonal feature.

To generate tone feature T(n), the silence and unvoiced speech section in a speech utterance should be disregarded. The reason is that the signals in those sections do not have fundamental frequencies. The pitch extracted from them would be some sort of random number which could cause great confusion during model training and recognition. Therefore an explicit voiced/unvoiced speech classifier is used for tone parameter extraction. Such voiced/unvoiced speech classifiers are known and any desired implementation can be used. One example of such a voiced/unvoiced classifier is described in an article entitled "Robust Voicing Estimation with Dynamic Time Warping" by T. Wang & V. Ciperman published in Proceedings of ICASSP 1998, page 533–536. The algorithm is based on waveform time-warping followed by spectral matching based on voiced and unvoiced spectral models.

Figure 4:
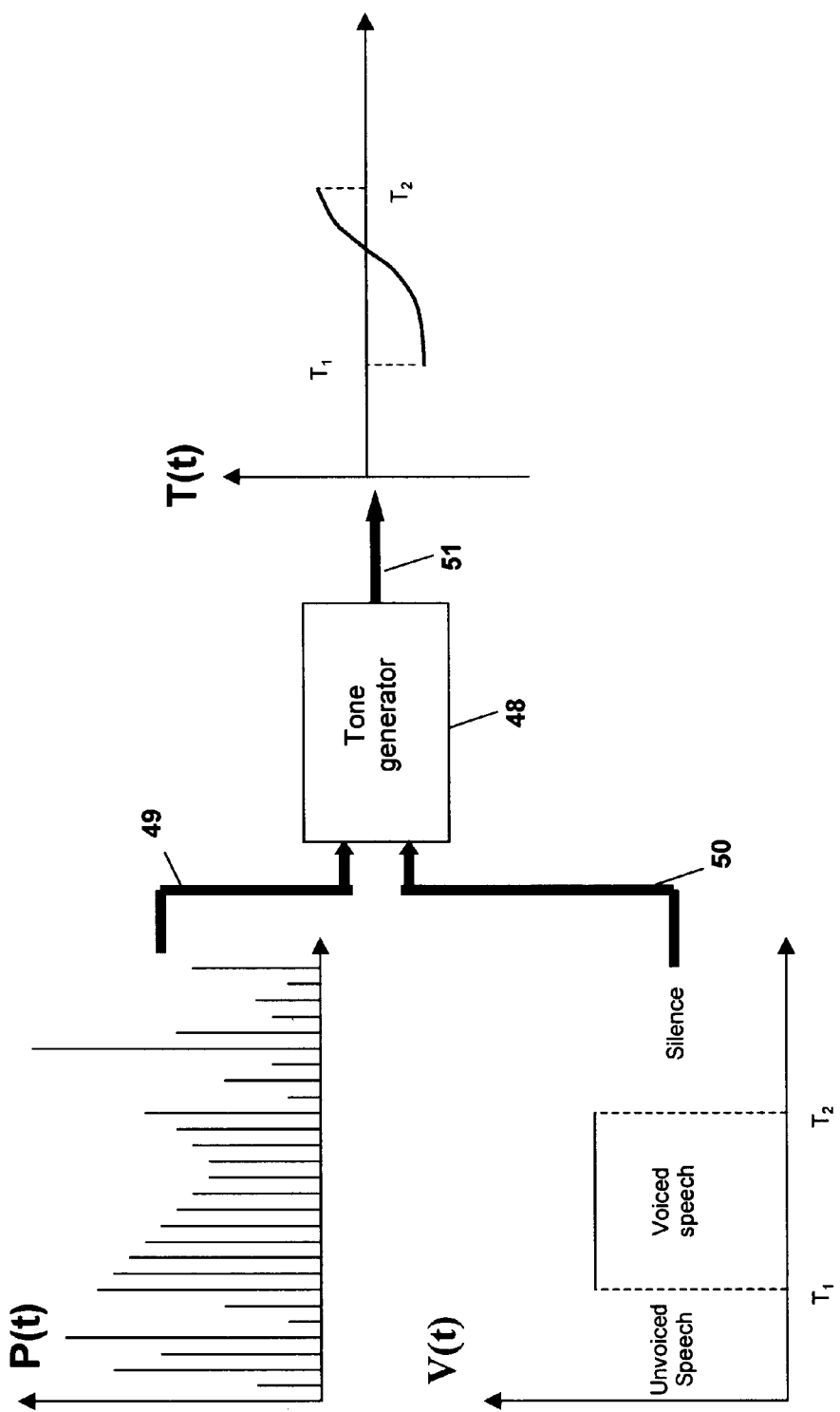
FIG. 4 shows a schematic diagram of the signals that are input and output of the tone generator of FIG. 3.

FIG. 4 shows the tone generation operation. There are two functions as the input of the tone generator. A tone feature can be generated from these two inputs by a linear regression function, for example, as follows $$T(t) = \sum_{j=-3}^{3} \alpha_j \times P(t+j) \times V(t)$$

where T(t) is a tone feature at time t; P(t+j) is the pitch frequency at time t+j obtained from the pitch detector; V(t) is the speech type function showing whether a frame contains voiced speech or not, with V(t)=1 if the frame contains voiced speech, and (t)=0 otherwise; and $\alpha_j$ is a weighting coefficient given by:

$\alpha_{-3}$=0.2, $\alpha_{-2}$=0.3, $\alpha_{-1}$=0.5, $\alpha_0$=0, $\alpha_1$=0.5, $\alpha_2$=0.3, $\alpha_3$=0.2.

As shown in FIG. 4, the pitch frequencies P(t) are provided at input 49 to the tone generator 48 and the speech type function V(t) is provided at input 50. The speech type function V(t) basically provides a "gate" function allowing the pitch frequencies only during voiced speech to be utilised to produce the tone function T(t), as provided at output 51 from the tone generator 48.

Thus, a typical 10 frame vowel in Mandarin may generate 10 tone features, such as "–9, –7, –6, –5, 0, 3, 5, 7, 8, 8". From these tone features it can be determined that this is a vowel of the third type of tone 3 in FIG. 1, since its pitch contour is in a dropping-rising pattern. This information would be included in the speech feature vectors passed to the speech recognition module and switched to either the model trainer 34 or the speech recogniser 35.

It will be appreciated that although only one particular embodiment of the invention has been described in detail, various modifications and improvements can be made by a person skilled in the art without departing from the scope of the present invention.

What we claim is:

1. A system for speech recognition comprising:
an input terminal for receiving a segment of speech;
a speech classifier having an input coupled to the input terminal and an output to provide an indication of whether the speech segment comprises voiced or unvoiced speech;
a speech feature detector having a first input coupled to the input terminal, a second input coupled to the output of the of the speech classifier, and an output to provide a speech feature vector having a plurality of feature values indicating features of the speech segment, the speech feature vector including at least a tonal feature value indicating a tonal feature of the speech segment when the speech segment comprises voiced speech; and
a speech recogniser having an input coupled to the output of the speech feature detector and an output to provide an indication of which of a predetermined plurality of speech models is a good match to the speech segment.

2. A system for speech recognition according to claim 1, further comprising an Analog-to-Digital (A/D) converter having an input coupled to the input terminal and an output coupled to the inputs of the speech classifier and the speech feature detector to provide a digitised speech segment.

3. A system for speech recognition according to claim 1, wherein the output of the speech recogniser provides an indication of which one of the predetermined plurality of speech models is a best match to the speech segment.

4. A system for speech recognition according to claim 1, further comprising a memory coupled to the speech recogniser for storing the predetermined plurality of speech models, and a speech model trainer having an input selectively coupled to the output of the speech feature detector and an output coupled to the memory to store in the memory the predetermined plurality of speech models after the predetermined plurality of speech models have been trained using the speech feature vector.

5. A system for speech recognition according to claim 1, wherein the speech feature detector comprises a non-tonal feature detector having an input coupled to the input of the speech feature detector and an output to provide at least one non-tonal feature value for the speech segment, a tonal feature detector having a first input coupled to the input of the speech feature detector, a second input coupled to the output of the speech classifier and an output to provide at least one tonal feature value for the speech segment when the speech classifier determines that the speech segment comprises voiced speech, and a speech feature vector generator having a first input coupled to the output of the non-tonal feature detector, a second input coupled to the output of the tonal feature detector, and an output coupled to the output of the speech feature detector to provide the speech feature vector.

6. A system for speech recognition according to claim 5, wherein the non-tonal feature detector comprises a non-tonal speech transformation circuit having an input coupled to the input of the non-tonal feature detector and an output to provide a transformed non-tonal signal, and a non-tonal feature generator having an input coupled to the output of the non-tonal speech transformation circuit and an output coupled to the output of the non-tonal feature detector to provide the at least one non-tonal feature value for the speech segment.

7. A system for speech recognition according to claim 5, wherein the tonal feature detector comprises a tonal speech transformation circuit having first and second inputs coupled to the first and second inputs of the tonal feature detector and an output to provide a transformed tonal signal, and a tonal feature generator having an input coupled to the output of the tonal speech transformation circuit and an output coupled to the output of the tonal feature detector to provide the at least one tonal feature value for the speech segment.

8. A system for speech recognition according to claim 7, wherein the tonal speech transformation circuit comprises:

a pitch extractor having an input coupled to the first input of the tonal speech transformation circuit and an output; and a tone generator having a first input coupled to the output of the pitch extractor and an output coupled to the output of the tonal speech transformation circuit to provide the transformed tonal signal indicative of the tone of the speech segment.

9. A system for speech recognition according to claim 8, wherein the tone generator has a second input coupled to the second input of the tonal speech transformation circuit.

10. A method of speech recognition comprising the steps of:

receiving a segment of speech;

classifying the speech segment according to whether the speech segment comprises voiced or unvoiced speech;

detecting a plurality of speech features of the segment of speech;

generating a speech feature vector having a plurality of feature values indicating the detected plurality of features of the speech segment, wherein the speech feature vector includes at least a tonal feature value indicating a tonal feature of the speech segment when the speech segment comprises voiced speech; and utilising the speech vector to determine which of a predetermined plurality of speech models is a good match to the speech segment.

11. A method of speech recognition according to claim 10, further comprising the step of digitising the segment of speech to provide a digitised speech segment.

12. A method of speech recognition according to claim 10, wherein the step of utilising the speech vector determines which of the predetermined plurality of speech models is a best match to the speech segment.

13. A method of speech recognition according to claim 10, further comprising the steps of:

training the predetermined plurality of speech models using the speech feature vector; and storing the predetermined plurality of speech models after the predetermined plurality of speech models have been trained.

14. A method of speech recognition according to claim 10, wherein the step of detecting a plurality of speech features comprises the steps of:

generating at least one non-tonal feature value for the speech segment;

generating at least one tonal feature value for the speech segment when the speech classifier determines that the speech segment comprises voiced speech; and combining the at least one non-tonal feature value and the at least one tonal feature value to provide the speech feature vector.

15. A method of speech recognition according to claim 14, wherein the step of detecting at least one non-tonal feature value comprises the steps of:

transforming the speech segment using at least a first transformation to provide a transformed non-tonal signal; and generating the at least one non-tonal feature value from the transformed non-tonal signal.

16. A method of speech recognition according to claim 14, wherein the step of detecting at least one tonal feature value comprises the steps of:

transforming the speech segment using at least a second transformation to provide a transformed tonal signal; and generating the at least one tonal feature value from the transformed tonal signal.

17. A method of speech recognition according to claim 16, wherein the step of transforming the speech segment comprises the steps of:

extracting pitch information from the speech segment; and generating the transformed tonal signal from the extracted pitch information.

* * * * *